(12) United States Patent
Liu et al.

(10) Patent No.: US 11,151,937 B2
(45) Date of Patent: Oct. 19, 2021

(54) DRIVING CIRCUIT, ARRAY SUBSTRATE, DISPLAY DEVICE AND DRIVING METHOD

(71) Applicants: Chengdu BOE Optoelectronics Technology Co., Ltd., Chengdu (CN); BOE TECHNOLOGY GROUP CO., LTD., Beijing (CN)

(72) Inventors: Ke Liu, Beijing (CN); Ling Shi, Beijing (CN); Wenqiang Li, Beijing (CN); Shuo Li, Beijing (CN); Xuewei Tian, Beijing (CN); Bingqiang Gui, Beijing (CN); Xiaoqi Ding, Beijing (CN)

(73) Assignees: Chengdu BOE Optoelectronics Technology Co., Ltd., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/766,192

(22) PCT Filed: Apr. 25, 2019

(86) PCT No.: PCT/CN2019/084335
§ 371 (c)(1),
(2) Date: May 21, 2020

(87) PCT Pub. No.: WO2020/215281
PCT Pub. Date: Oct. 29, 2020

(65) Prior Publication Data
US 2021/0233466 A1    Jul. 29, 2021

(51) Int. Cl.
*G09G 3/3233* (2016.01)
*G06K 9/00* (2006.01)

(52) U.S. Cl.
CPC ......... *G09G 3/3233* (2013.01); *G06K 9/0002* (2013.01); *G09G 2300/026* (2013.01)

(58) Field of Classification Search
CPC .......... G09G 3/3233; G09G 2300/026; G06K 9/0002
See application file for complete search history.

(56) References Cited

U.S. PATENT DOCUMENTS 9,679,182 B2  6/2017  Bae et al.
9,864,448 B2  1/2018  Bae et al.
(Continued)

FOREIGN PATENT DOCUMENTS

CN    106098736 A    11/2016
CN    108021854 A     5/2018
(Continued)

OTHER PUBLICATIONS

International Search Report and Written Opinion dated Jan. 20, 2020 for PCT Patent Application No. PCT/CN2019/084335.

*Primary Examiner* — Premal R Patel
(74) *Attorney, Agent, or Firm* — Thomas | Horstemeyer, LLP

(57) ABSTRACT

The present disclosure provides a driving circuit and a driving method thereof, an array substrate, a display device, and a driving method thereof. The driving circuit is applied for driving a light-emitting element and a fingerprint detection element, and includes: a driving sub-circuit, outputting a light-emitting driving current to the light-emitting element under the control of a driving node; a data writing sub-circuit, communicating a data input terminal with the driving node in response to a scanning signal of a scanning signal terminal; a first energy storage sub-circuit, coupled to the driving node and a control signal terminal; a detection sub-circuit, outputting a detection current under the control of an output terminal of the fingerprint detection element; and a data output sub-circuit, outputting a detection current
(Continued)

to the data output terminal in response to the scanning signal of the scanning signal terminal.

20 Claims, 8 Drawing Sheets

(56) References Cited

U.S. PATENT DOCUMENTS

| | | | |
|---|---|---|---|
| 9,996,179 | B2 | 6/2018 | Bae et al. |
| 2016/0048717 | A1* | 2/2016 | Yang .................... G06K 9/0002 382/124 |
| 2016/0132713 | A1 | 5/2016 | Bae et al. |
| 2016/0266688 | A1* | 9/2016 | Yang .................... G06F 3/04184 |
| 2017/0103706 | A1* | 4/2017 | Yang ....................... G06F 3/044 |
| 2017/0242516 | A1 | 8/2017 | Bae et al. |
| 2017/0364188 | A1 | 12/2017 | Bae et al. |

FOREIGN PATENT DOCUMENTS

| | | |
|---|---|---|
| CN | 108280432 A | 7/2018 |
| CN | 108806587 A | 11/2018 |
| CN | 106098736 B | 5/2019 |

\* cited by examiner

US 11,151,937 B2

DRIVING CIRCUIT, ARRAY SUBSTRATE, DISPLAY DEVICE AND DRIVING METHOD

CROSS-REFERENCE TO RELATED APPLICATION

This application is a national phase application under 35 U.S.C. § 371 of International Patent Application No. PCT/CN2019/084335, filed on Apr. 25, 2019, the contents of which being incorporated by reference in their entirety herein.

TECHNICAL FIELD

The present disclosure relates to the field of display technology and, in particular, to a driving circuit and a driving method thereof, an array substrate, a display device, and a driving method thereof.

BACKGROUND

In the field of display devices, fingerprint detection technology has been widely used. In an in-cell display panel with fingerprint detection function, a driving circuit of a fingerprint detection sensor and a driving circuit of a pixel are integrated in a same driving circuit layer and thus, a circuit in a display area of the display panel is complicated such that it is difficult for the display panel to achieve a high resolution.

The above information disclosed in the background section is only for enhancing understanding of the background of the present disclosure, so it may include information that does not constitute prior art known to those of ordinary skill in the art.

SUMMARY

The present disclosure is to provide a driving circuit and a driving method thereof, an array substrate, a display device, and a driving method thereof.

In order to achieve the above object, the present disclosure adopts the following technical solutions.

According to a first aspect of the present disclosure, there is provided a driving circuit for driving a light-emitting element and a fingerprint detection element, including:

a driving sub-circuit coupled to a first voltage terminal, a driving node, and an input terminal of the light-emitting element, and configured to output a light-emitting driving current to the input terminal of the light-emitting element under the control of the driving node;

a data writing sub-circuit coupled to the driving node, a scanning signal terminal, and a data input terminal, and configured to communicate the data input terminal with the driving node in response to a scanning signal of the scanning signal terminal;

a first energy storage sub-circuit coupled to the driving node and a control signal terminal;

a detection sub-circuit coupled to the first voltage terminal and an output terminal of the fingerprint detection element, and configured to output a detection current under the control of the output terminal of the fingerprint detection element; and a data output sub-circuit coupled to the detection sub-circuit, the scanning signal terminal, and a data output terminal, and configured to output the detection current to the data output terminal in response to the scanning signal of the scan signal terminal.

In an exemplary embodiment of the present disclosure, the driving circuit further includes a second energy storage sub-circuit coupled to the data writing sub-circuit and the data input terminal.

The data writing sub-circuit is further coupled to the input terminal of the light-emitting element, and is configured to communicate the input terminal of the light-emitting element with the driving node in response to the scanning signal of the scanning signal terminal.

In an exemplary embodiment of the present disclosure, the driving circuit further includes:

a first reset sub-circuit coupled to the control signal terminal, a reset control terminal, and the driving node, and configured to output a signal of the control signal terminal to the driving node in response to a reset control signal of the reset control terminal; and a second reset sub-circuit coupled to the control signal terminal, the reset control terminal, and the output terminal of the fingerprint detection element, and configured to output the signal of the control signal terminal to the output terminal of the fingerprint detection element in response to the reset control signal of the reset control terminal.

In an exemplary embodiment of the present disclosure, the first reset sub-circuit is coupled to the input terminal of the light-emitting element, and is coupled to the driving node through the data writing sub-circuit.

In an exemplary embodiment of the present disclosure, the second reset sub-circuit is coupled to the control signal terminal through the output terminal of the fingerprint detection element.

In an exemplary embodiment of the present disclosure, the driving sub-circuit includes a first thin film transistor, and the first thin film transistor includes a first terminal coupled to the first voltage terminal, a second terminal coupled to the input terminal of the light-emitting element and a control terminal coupled to the driving node.

The data writing sub-circuit includes a second thin film transistor, and the second thin film transistor includes a first terminal coupled to the driving node, a second terminal coupled to the input terminal of the light-emitting element and a control terminal coupled to the scanning signal terminal.

The first reset sub-circuit includes a third thin film transistor, and the third thin film transistor includes a first terminal coupled to the control signal terminal, a second terminal coupled to the input terminal of the light-emitting element and a control terminal coupled to the reset control terminal.

The first energy storage sub-circuit includes a first capacitor, and the first capacitor includes a first terminal coupled to the driving node and a second terminal coupled to the control signal terminal.

The second energy storage sub-circuit includes a second capacitor, and the second capacitor includes a first terminal coupled to the input terminal of the light-emitting element and a second terminal coupled to the data input terminal.

The detection sub-circuit includes a fourth thin film transistor, and the fourth thin film transistor includes a first terminal coupled to the first voltage terminal and a control terminal coupled to the output terminal of the fingerprint detection element.

The data output sub-circuit includes a fifth thin film transistor, and the fifth thin film transistor includes a first terminal coupled to a second terminal of the fourth thin film transistor, a second terminal coupled to the data output terminal and a control terminal coupled to the scanning signal terminal.

The second reset sub-circuit includes a sixth thin film transistor, and the sixth thin film transistor includes a first terminal coupled to the input terminal of the light-emitting element, a second terminal coupled to the output terminal of the fingerprint detection element and a control terminal coupled to the reset control terminal.

In an exemplary embodiment of the present disclosure, the first thin film transistor, the second thin film transistor, the third thin film transistor, the fourth thin film transistor, the fifth thin film transistor and the sixth thin film transistor are N-type thin film transistors.

In an exemplary embodiment of the present disclosure, the driving sub-circuit includes a first thin film transistor, and the first thin film transistor includes a first terminal coupled to the first voltage terminal, a second terminal coupled to the input terminal of the light-emitting element and a control terminal coupled to the driving node.

In an exemplary embodiment of the present disclosure, the data writing sub-circuit includes a second thin film transistor, and the second thin film transistor includes a first terminal coupled to the driving node, a second terminal coupled to the data input terminal and a control terminal coupled to the scanning signal terminal.

In an exemplary embodiment of the present disclosure, the first energy storage sub-circuit includes a first capacitor, and the first capacitor includes a first terminal coupled to the driving node and a second terminal coupled to the control signal terminal.

In an exemplary embodiment of the present disclosure, the detection sub-circuit includes a fourth thin film transistor, and the fourth thin film transistor includes a first terminal coupled to the first voltage terminal, a control terminal coupled to the output terminal of the fingerprint detection element and a second terminal coupled to the data output sub-circuit.

In an exemplary embodiment of the present disclosure, the data output sub-circuit includes a fifth thin film transistor, and the fifth thin film transistor includes a first terminal coupled to the detection sub-circuit, a second terminal coupled to the data output terminal and a control terminal coupled to the scanning signal terminal.

According to a second aspect of the present disclosure, there is provided a driving method of a driving circuit for driving the driving circuit described above, including:

during a scanning period, outputting a first voltage to the first voltage terminal, outputting a scanning signal to the scanning signal terminal, and outputting a data signal to the data input terminal, so that the data writing sub-circuit applies the data signal to the driving node, and the data output sub-circuit outputs a detection current to the data output terminal, wherein the detection current is generated by the detection sub-circuit in response to a voltage of the output terminal of the fingerprint detection element, and the voltage of the output terminal of the fingerprint detection element is generated by the fingerprint detection element in response to a detection signal reflected by a finger and received by the fingerprint detection element; and during a light-emitting period after the scanning period, outputting the first voltage to the first voltage terminal, and outputting a light-emitting signal to the control signal terminal, wherein a voltage of the driving node is changed correspondingly as a voltage of the control signal terminal is changed, so that the driving sub-circuit outputs a light-emitting driving current to the input terminal of the light-emitting element.

In an exemplary embodiment of the present disclosure, the driving circuit further includes a second energy storage sub-circuit coupled to the data writing sub-circuit and the data input terminal, and the data writing sub-circuit is further coupled to the input terminal of the light-emitting element, and is configured to communicate the input terminal of the light-emitting element with the driving node in response to the scanning signal of the scanning signal terminal.

The driving method of the driving circuit further includes:

during a threshold compensation period before the scanning period, outputting a second voltage to the first voltage terminal to change a potential difference between the driving node and the first voltage terminal, so that the driving sub-circuit outputs a current; and outputting the scanning signal to the scanning signal terminal, so that the current flows through the data writing sub-circuit to change a electromotive force of the driving node until the driving sub-circuit is turned off.

In an exemplary embodiment of the present disclosure, the driving circuit further includes:

a first reset sub-circuit coupled to the control signal terminal, a reset control terminal, and the driving node, and configured to output a signal of the control signal terminal to the driving node in response to a reset control signal of the reset control terminal; and a second reset sub-circuit coupled to the control signal terminal, the reset control terminal, and the output terminal of the fingerprint detection element, and configured to output the signal of the control signal terminal to the output terminal of the fingerprint detection element in response to the reset control signal of the reset control terminal.

The driving method of the driving circuit further includes:

during a reset period before the threshold compensation period, outputting a reset signal to the control signal terminal, and outputting the reset control signal to the reset control terminal, so that the reset signal is applied to the driving node and the output terminal of the fingerprint detection element.

In an exemplary embodiment of the present disclosure, the first reset sub-circuit is coupled to the input terminal of the light-emitting element, and is coupled to the driving node through the data writing sub-circuit, and the driving method further includes:

during the reset period, outputting the scanning signal to the scanning signal terminal, so that the reset signal is applied to the driving node through the first reset sub-circuit and the data writing sub-circuit.

According to a third aspect of the present disclosure, there is provided an array substrate, including a plurality of display modules arranged in an array. Any one of the display modules includes:

the driving circuit described above;

the light-emitting element, having the input terminal coupled to the driving sub-circuit of the driving circuit and an output terminal coupled to a second voltage terminal; and the fingerprint detection element, having the output terminal coupled to the detection sub-circuit.

In an exemplary embodiment of the present disclosure, the fingerprint detection element is an ultrasonic fingerprint sensor.

According to a fourth aspect of the present disclosure, there is provided a display device, including the array substrate described above.

According to a fifth aspect of the present disclosure, there is provided a driving method of a display device, which is applied to the display device described above, including:

during a detection period, outputting a detection control signal to each of the fingerprint detection elements of the display modules, so that each of the fingerprint detection elements outputs a detection signal;

during a scanning period after the detection period, driving respective display modules row by row, wherein a method of driving any one of the display modules includes: outputting a first voltage to a corresponding first voltage terminal, outputting a scanning signal to a corresponding scanning signal terminal, and outputting a data signal to a corresponding data input terminal, so that a corresponding data writing sub-circuit applies the data signal to a corresponding driving node, and a corresponding data output sub-circuit outputs a detection current to a corresponding data output terminal, wherein the detection current is generated by a corresponding detection sub-circuit in response to a voltage of the output terminal of a corresponding fingerprint detection element, and the voltage of the output terminal of the corresponding fingerprint detection element is generated by the corresponding fingerprint detection element in response to a detection signal of the finger received by the corresponding fingerprint detection element; and during a light-emitting period after the scanning period, driving each of the display modules, wherein a method of driving any one of the display modules includes: outputting the first voltage to the corresponding first voltage terminal, and outputting a light-emitting signal to a corresponding control signal terminal, a voltage of the corresponding driving node is changed correspondingly as a voltage of the corresponding control signal terminal is changed, so that a corresponding driving sub-circuit outputs a light-emitting driving current to the input terminal of a corresponding light-emitting element.

In an exemplary embodiment of the present disclosure, the driving circuit of any one of the display modules further includes a second energy storage sub-circuit coupled to the corresponding data writing sub-circuit and the corresponding data input terminal, and the corresponding data writing sub-circuit is further coupled to the input terminal of the corresponding light-emitting element, and is configured to communicate the input terminal of the corresponding light-emitting element with the corresponding driving node in response to the scanning signal of the corresponding scanning signal terminal.

The driving method of the display device further includes:

during a threshold compensation period before the detection period, performing threshold compensation on each of the display modules, wherein a method of performing the threshold compensation on any one of the display modules includes: outputting a second voltage to the corresponding first voltage terminal to change a potential difference between the corresponding driving node and the corresponding first voltage terminal, so that the corresponding driving sub-circuit outputs a current; and outputting the scanning signal to the corresponding scanning signal terminal, so that the current flows through the corresponding data writing sub-circuit to change a electromotive force of the corresponding driving node until the corresponding driving sub-circuit is turned off.

In an exemplary embodiment of the present disclosure, the driving circuit of any one of the display modules further includes:

a first reset sub-circuit coupled to the control signal terminal, a reset control terminal, and the driving node, and configured to output a signal of the control signal terminal to the driving node in response to a reset control signal of the reset control terminal; and a second reset sub-circuit coupled to the control signal terminal, the reset control terminal, and the output terminal of the fingerprint detection element, and configured to output the signal of the control signal terminal to the output terminal of the fingerprint detection element in response to the reset control signal of the reset control terminal.

The driving method of the display device further includes:

during a reset period before the threshold compensation period, resetting each of the display modules, wherein a method of resetting any one of the display modules includes outputting a reset signal to the corresponding control signal terminal, and outputting the reset control signal to a corresponding reset control terminal, so that the reset signal is applied to the corresponding driving node and the output terminal of the corresponding fingerprint detection element.

In an exemplary embodiment of the present disclosure, in the driving circuit of each of the display modules, the first reset sub-circuit is coupled to the input terminal of the light-emitting element, and is coupled to the driving node through the data writing sub-circuit. The driving method of the display device further includes:

during the reset period, outputting the scanning signal to the scanning signal terminal of each of the display modules.

BRIEF DESCRIPTION OF THE DRAWINGS

The above and other features and advantages of the present disclosure will become more apparent by describing in detail example embodiments thereof with reference to the drawings.

DETAILED DESCRIPTION

Figure 1:
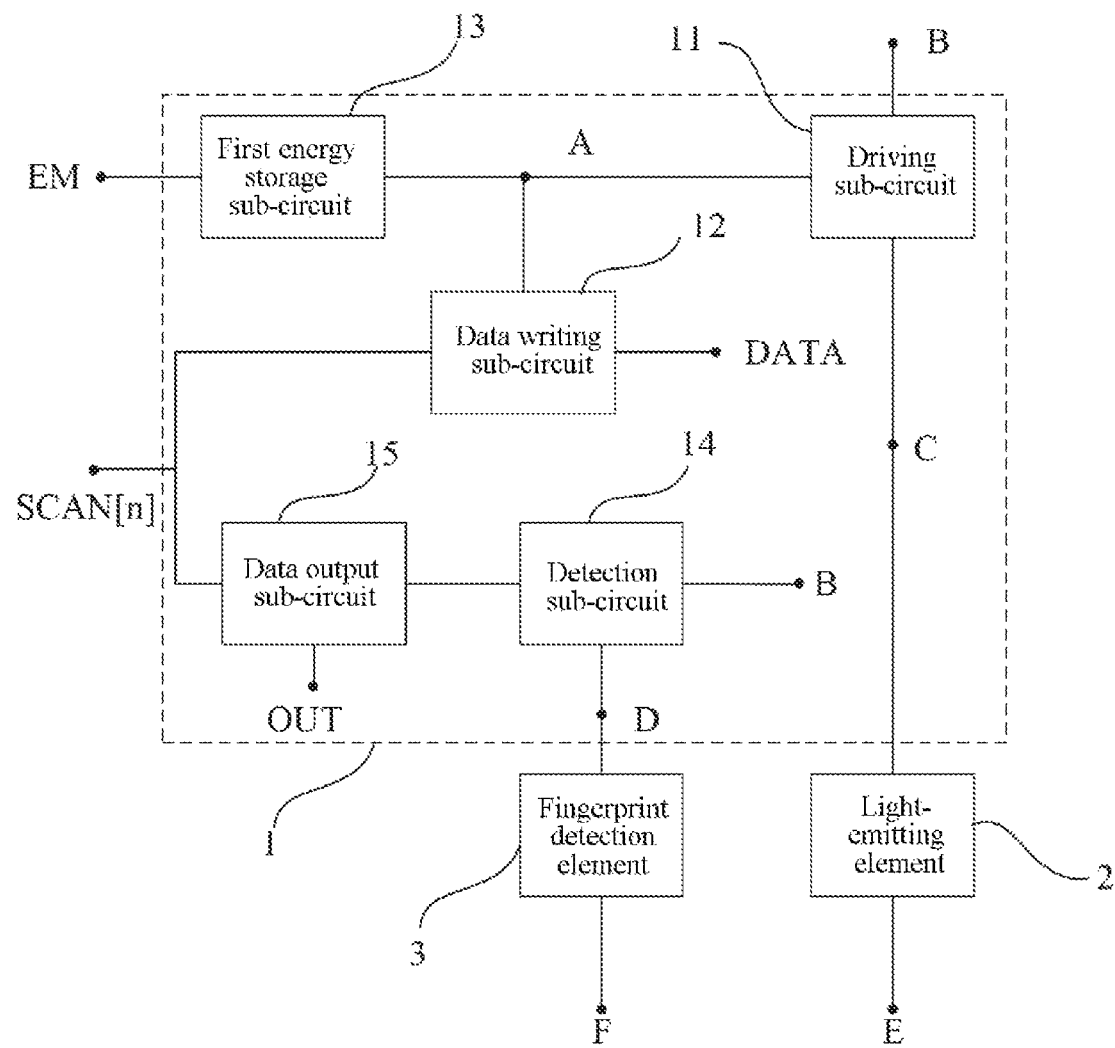
FIG. 1 is a schematic structural diagram of a driving circuit according to an embodiment of the present disclosure.

Example embodiments will now be described more fully with reference to the drawings. However, the example embodiments may be implemented in various forms, and should not be construed as being limited to the embodiments set forth herein; on the contrary, these embodiments are provided so that the present disclosure is comprehensive and complete and fully convey the concept of the example embodiments to those skilled in the art. The described features, structures or characteristics may be combined in one or more embodiments in any suitable manner. In the following description, many specific details are provided for a full understanding of the embodiments of the present disclosure.

In the figures, thicknesses of an area and a layer may be exaggerated for clarity. Same reference numerals in the drawings denote same or similar structures, and thus detailed descriptions thereof will be omitted.

When a structure is "on" another structure, it may indicate that the structure is integrally formed on the other structure, or that the structure is "directly" disposed on the other structure, or that the structure is disposed "indirectly" on the other structure through another structure. When two electronic components are "coupled/connected", it may indicate that the two electronic components are "directly electrically coupled/connected", or that the two electronic components are "indirectly electrically coupled/connected" through another electronic component.

The terms "an", "a", and "said" are used to indicate the presence of one or more elements/components/etc.; the terms "include" and "have" are used to mean an open-ended inclusion and refer to that in addition to listed elements/components/etc., there may be additional elements/components/etc. The terms "first" and "second" are only used as markers, and are not to limit the number of objects.

An embodiment of the present disclosure provides a driving circuit for driving a light-emitting element and a fingerprint detection element. As shown in FIG. 1, the driving circuit 1 includes a driving sub-circuit 11, a data writing sub-circuit 12, a first energy storage sub-circuit 13, a detection sub-circuit 14, and a data output sub-circuit 15.

The driving sub-circuit 11 is coupled to a first voltage terminal B, a driving node A, and an input terminal C of the light-emitting element 2, and is configured to output a light-emitting driving current to the input terminal of the light-emitting element 2 under the control of the driving node A. The data writing sub-circuit 12 is coupled to the driving node A, a scanning signal terminal SCAN[n], and a data input terminal DATA, and is configured to communicate the data input terminal DATA with the driving node A in response to a scanning signal of the scanning signal terminal SCAN[n]. The first energy storage sub-circuit 13 is coupled to the driving node A and a control signal terminal EM. The detection sub-circuit 14 is coupled to the first voltage terminal B and an output terminal D of the fingerprint detection element 3, and is configured to output a detection current under the control of the output terminal D of the fingerprint detection element 3. The data output sub-circuit 15 is coupled to the detection sub-circuit 14, the scanning signal terminal SCAN[n] and a data output terminal OUT, and is configured to output the detection current to the data output terminal OUT in response to the scanning signal of the scanning signal terminal SCAN[n].

In the driving circuit 1 provided by the present disclosure, the driving sub-circuit 11, the data writing sub-circuit 12, and the first energy storage sub-circuit 13 constitute a pixel driving sub-circuit, and the detection sub-circuit 14 and the data output sub-circuit 15 constitute a fingerprint detection sub-circuit. The pixel driving sub-circuit and the fingerprint detection sub-circuit are integrated in a same driving circuit 1, which can reduce complexity of a circuit in a display area of an in-cell display device with display function, and can reduce an area ratio of the driving circuit 1 in the display area, which can improve resolution of the display area.

Further, the scanning signal terminal SCAN[n] simultaneously controls the data writing sub-circuit 12 and the data output sub-circuit 15 so, while a data signal for controlling the light-emitting element 2 to emit light is written to the driving circuit 1, the driving circuit 1 can output a detection current for fingerprint detection. In this way, the driving circuit 1 does not need to be coupled to two different scanning gate lines, which reduces the number of gate lines in a gate driving integrated area (GOA area) coupled to the driving circuit 1, and reduces complexity of a circuit in the gate driving integrated area, which reduces a frame of the display device adopting the driving circuit 1.

The driving circuit 1 provided by the embodiment of the present disclosure will be described in detail below with reference to the drawings.

Figure 3:
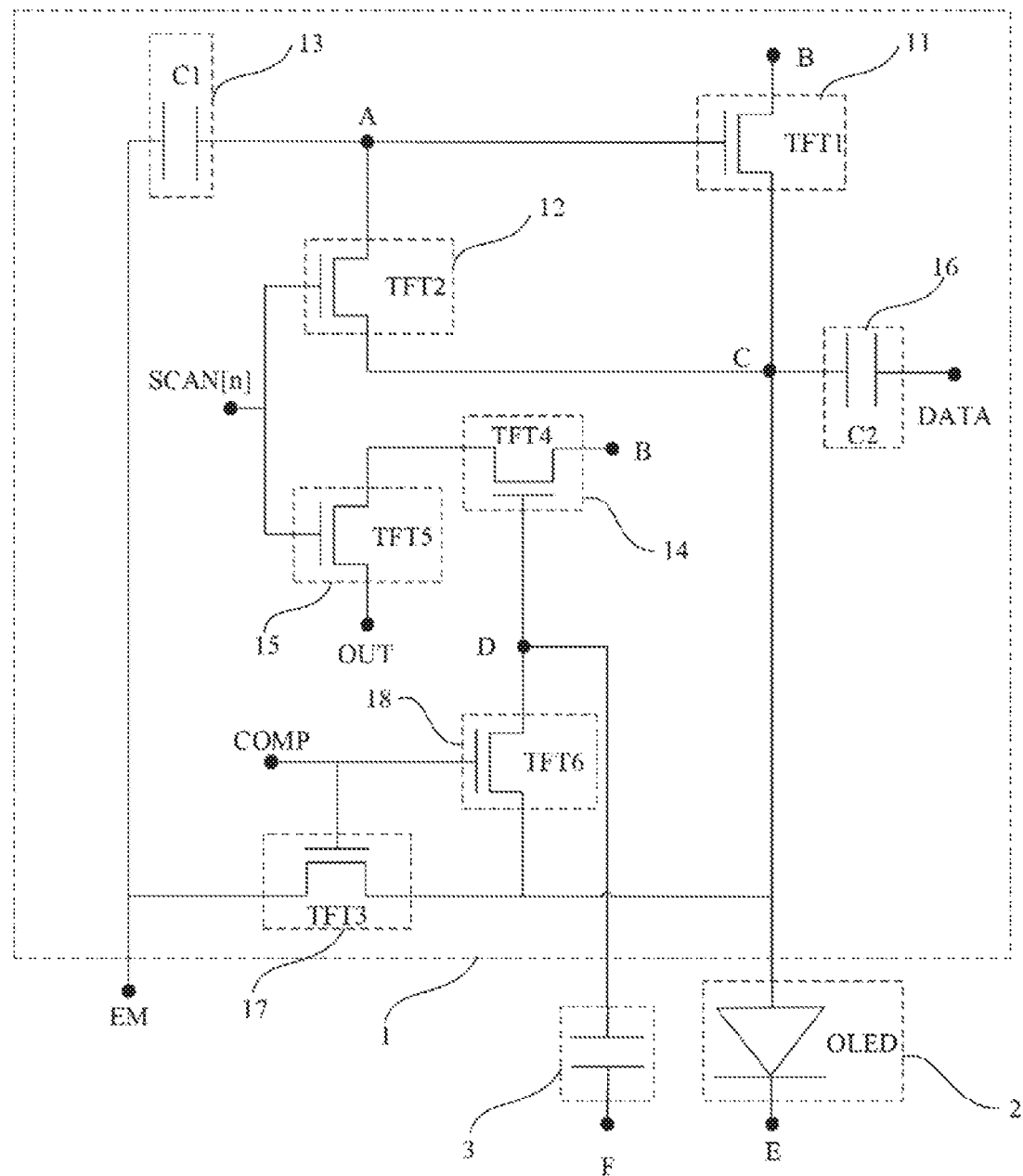
FIG. 3 is a schematic structural diagram of a driving circuit according to an embodiment of the present disclosure.

The driving sub-circuit 11 may include one or more transistors. For example, in an embodiment, as shown in FIG. 3, the driving sub-circuit 11 may include a first thin film transistor TFT1, a first terminal of the first thin film transistor TFT1 is coupled to the first voltage terminal B, a second terminal of the first thin film transistor TFT1 is coupled to the input terminal C of the light-emitting element 2, and a control terminal of the first thin film transistor TFT1 is coupled to the driving node A.

The data writing sub-circuit 12 may include one or more transistors. For example, in an embodiment, as shown in FIG. 3, the data writing sub-circuit 12 includes a second thin film transistor TFT2, a first terminal of the second thin film transistor TFT2 is coupled to the driving node A, a second terminal of the second thin film transistor TFT2 is coupled to the data input terminal DATA, and a control terminal of the second thin film transistor TFT2 is coupled to the scan signal terminal SCAN[n]. In this way, when the second thin film transistor TFT2 is turned on by the scanning signal, the data input terminal DATA is coupled to the driving node A, and further coupled to the first energy storage sub-circuit 13, so that the data signal is written to the driving node A to realize data writing.

The first energy storage sub-circuit 13 may include one or more capacitors. For example, in an embodiment, as shown in FIG. 3, the first energy storage sub-circuit 13 includes a first capacitor C1, a first terminal of the first capacitor C1 is coupled to the driving node A, and a second terminal of the first capacitor C1 is coupled to the control signal terminal EM. In this way, a voltage of the control signal terminal EM can be applied to the second terminal of the first capacitor C1.

The detection sub-circuit 14 may include one or more transistors. For example, in an embodiment, as shown in FIG. 3, the detection sub-circuit 14 may include a fourth thin film transistor TFT4, a first terminal of the fourth thin film transistor TFT4 is coupled to the first voltage terminal B, and a control terminal of the fourth thin film transistor TFT4 is coupled to the output terminal D of the fingerprint detection element 3. In this way, the fingerprint detection element 3 outputs a detection voltage to the output terminal D of the fingerprint detection element 3 in response to a detection signal reflected by a finger and received by the fingerprint detection element 3, and the voltage (detection voltage) of the output terminal D of the fingerprint detection element 3 can control the fourth film The transistor TFT4 to output a detection current to a second terminal of the fourth thin film transistor TFT4, and a magnitude of the detection current is related to a magnitude of the voltage of the output terminal D of the fingerprint detection element 3.

The data output sub-circuit 15 may include one or more transistors. For example, in an embodiment, as shown in FIG. 3, the data output sub-circuit 15 includes a fifth thin film transistor TFT5, a first terminal of the fifth thin film transistor TFT5 is coupled to the second terminal of the fourth thin film transistor TFT4, a second terminal of the fifth thin film transistor TFT5 is coupled to the data output terminal OUT, and a control terminal of the fifth thin film transistor TFT5 is coupled to the scanning signal terminal SCAN[n]. In this way, when the scanning signal is applied to the control terminal of the fifth thin film transistor TFT5, the fifth thin film transistor TFT5 is turned on, so that the detection current is output to the data output terminal OUT.

Figure 4:
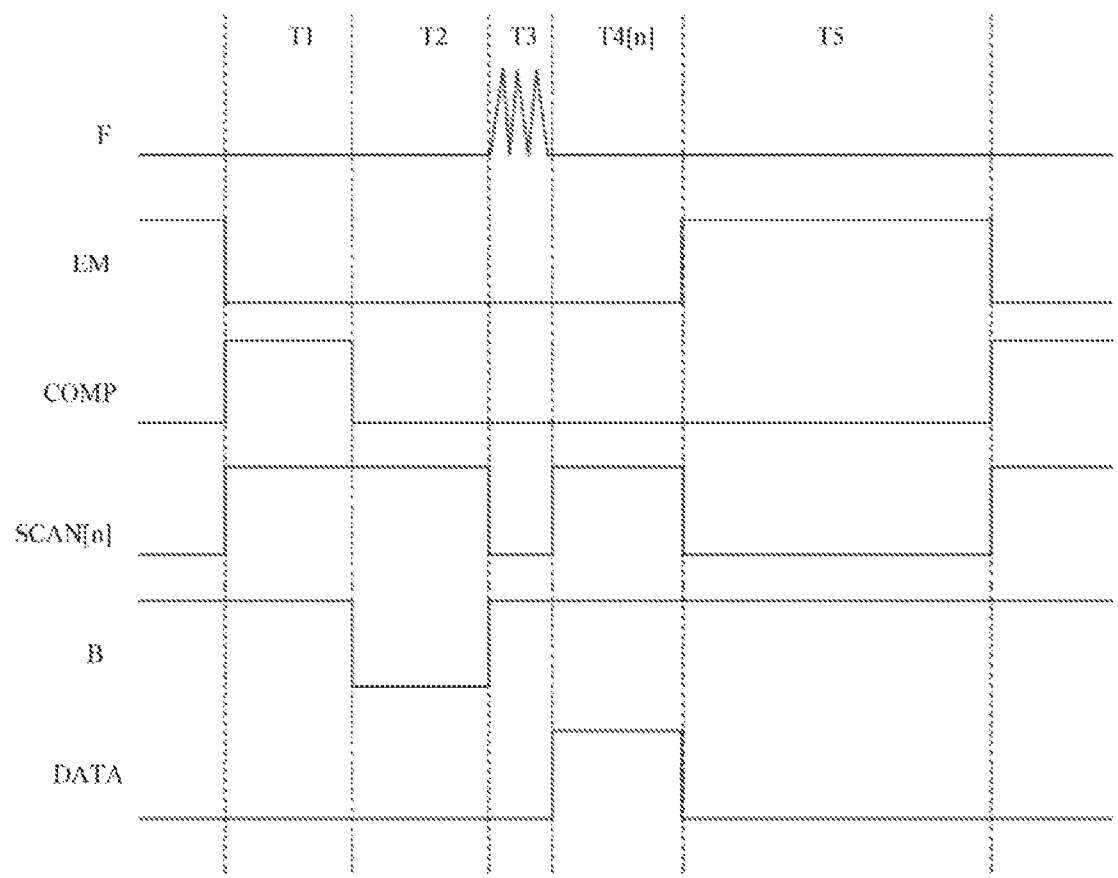
FIG. 4 is a schematic diagram of timing control of a driving circuit according to an embodiment of the present disclosure.

As shown in FIG. 4, when the driving circuit 1 is driven, a first voltage can be output to the first voltage terminal B during a scanning period T4[n], so that the voltage of the first voltage terminal B is the first voltage. Also, during the scanning period T4[n], the scanning signal is output to the scanning signal terminal SCAN[n], so that the second thin film transistor TFT2 is turned on, and the driving node A is communicated with the data input terminal DATA. Further, during the scanning time T4[n], the data signal is output to the data input terminal DATA, so that the data signal is applied to the driving node A. The first voltage may be output to the first voltage terminal B during the scanning time T4[n], so that the voltage of the first voltage terminal B is the first voltage. Also, during the scanning time T4[n], the scanning signal is output to the scanning signal terminal SCAN[n], so that the fifth thin film transistor TFT5 is turned on, and the detection current is output to the data output terminal OUT. The first voltage may be output to the first voltage terminal B during a light-emitting period T5 after the scanning period T4[n], so that the voltage of the first voltage terminal B is the first voltage. Further, during the light-emitting period T5, a light-emitting signal is output to the control signal terminal EM, so that a voltage of the second terminal of the first capacitor C1 is changed to be a voltage of the light-emitting signal, a voltage of the driving node A is changed through a coupling effect, and the changed voltage of the driving node A enables the first thin film transistor TFT1 to be turned on, and thus the driving sub-circuit 11 outputs a light-emitting driving current to the input terminal of the light-emitting element 2, thereby causing the light-emitting element 2 to emit light.

It can be seen that, the driving circuit 1 provided by the present disclosure can simultaneously write the data signal and output the detection current by using the same scanning signal during the scanning period T4[n]. The driving circuit 1 only needs one scanning signal, and therefore only needs one scanning gate line to be coupled thereto.

In an embodiment, when the data signal is applied to the driving node A and the voltage of the first voltage terminal B is the first voltage, the first thin film transistor TFT1 is not turned on to prevent the light-emitting element 2 from emitting light during a period other than the light-emitting period T5.

Figure 2:
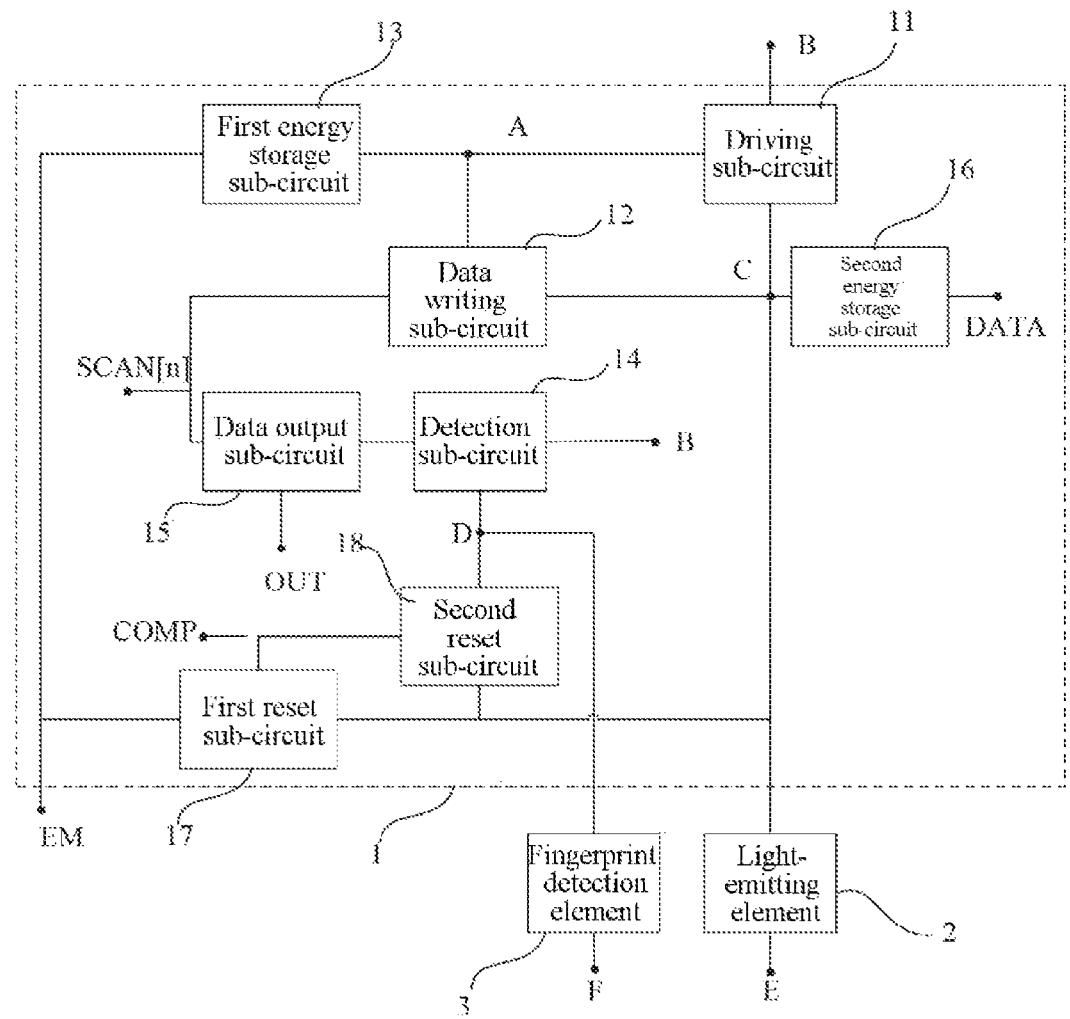
FIG. 2 is a schematic structural diagram of a driving circuit according to an embodiment of the present disclosure.

As shown in FIG. 2, the driving circuit 1 may further include a second energy storage sub-circuit 16 coupled to the data writing sub-circuit 12 and the data input terminal DATA. The data writing sub-circuit 12 is further coupled to the input terminal C of the light-emitting element 2 and is configured to communicate the input terminal C of the light-emitting element 2 with the driving node A in response to the scanning signal of the scanning signal terminal SCAN[n]. The second energy storage sub-circuit 16 may include one or more capacitors.

For example, in an embodiment, as shown in FIG. 3, the second energy storage sub-circuit 16 includes a second capacitor C2, a first terminal of the second capacitor C2 is coupled to the data input terminal DATA, and a second terminal of the second capacitor C2 is coupled to the input terminal C of the light-emitting element 2. The first terminal of the second thin film transistor TFT2 is coupled to the driving node A, and the second terminal of the second thin film transistor TFT2 is coupled to the input terminal C of the light-emitting element 2.

As shown in FIG. 4, when the driving circuit 1 is driven, a second voltage can be output to the first voltage terminal B during a threshold compensation period T2 before the scanning period T4[n], and then a potential difference between the driving node A and the first voltage terminal B is changed, that is, a gate-source voltage of the first thin film transistor TFT1 is changed. Therefore, when the voltage of the first voltage terminal B is the second voltage, the first thin film transistor TFT1 is turned on to output a current. Also, during the threshold compensation period T2, the scanning signal is output to the scanning signal terminal SCAN[n], so that the second thin film transistor TFT2 is turned on, the driving node A is communicated with the second terminal of the first thin film transistor TFT1, and the voltage of the driving node A is being changed continually until the voltage between the driving node A and the first voltage terminal B is a threshold voltage of the first thin film transistor TFT1. In this way, the threshold voltage of the first thin-film transistor TFT1 can be written to the driving node A to realize the threshold compensation of the first thin-film transistor TFT1 in the driving circuit 1 to overcome brightness deviation of the light-emitting element 2 caused by aging of the first thin-film transistor TFT1.

As shown in FIG. 2, the driving circuit 1 may further include a first reset sub-circuit 17, which is coupled to the control signal terminal EM, a reset control terminal COMP, and the driving node A, and is configured to output the signal of the control signal terminal EM to the driving node A in response to a reset control signal of the reset control terminal COMP. During a reset period T1 before the threshold compensation period T2, a reset signal is output to the control signal terminal EM, and the reset control signal is output to the reset control terminal COMP, so that the reset signal can be applied to the driving node A, and thus the driving node A is reset.

The first reset sub-circuit 17 may include one or more transistors. For example, in an embodiment, as shown in FIG. 4, the first reset sub-circuit 17 includes a third thin film transistor TFT3, a first terminal of the third thin film transistor TFT3 is coupled to the control signal terminal EM, a second terminal of the third thin film transistor TFT3 is coupled to the driving node A, and a control terminal of the third thin film transistor TFT3 is coupled to the reset control terminal COMP.

In an embodiment, as shown in FIG. 2, the first reset sub-circuit 17 may be coupled to the input terminal C of the light-emitting element 2, and may be coupled to the driving node A through the data writing sub-circuit 12. For example, as shown in FIG. 3, the second terminal of the third thin film transistor TFT3 is coupled to the input terminal C of the light-emitting element 2, and the input terminal C of the light-emitting element 2 is coupled to the second terminal of the second thin film transistor TFT2. In this way, as shown in FIG. 4, during the reset period T1, the reset control signal can be output to the reset control terminal COMP, so that the third thin film transistor TFT3 is turned on; during the reset period T1, the scanning signal is output to the second thin film transistor TFT2, so that the second thin film transistors TFT2 is turned on; and during the reset period T1, the reset signal is output to the control signal terminal EM, so that the reset signal is applied to the driving node A.

As shown in FIG. 2, the driving circuit 1 may further include a second reset sub-circuit 18, which is coupled to the control signal terminal EM, the reset control terminal COMP and the output terminal D of the fingerprint detection element 3, and is configured to output the signal of the control signal terminal EM to the output terminal D of the fingerprint detection element 3 in response to the reset control signal of the reset control terminal COMP. In this way, as shown in FIG. 4, during the reset period T1, the reset signal is output to the control signal terminal EM, and the reset control signal is output to the reset control terminal COMP, so that the reset signal is applied to the output terminal D of the fingerprint detection element 3 to realize resetting of the output terminal D of the fingerprint detection element 3. In an embodiment, the second reset sub-circuit 18 may be coupled to the control signal terminal EM through the output terminal D of the fingerprint detection element 3.

The second reset sub-circuit 18 may include one or more transistors. For example, as shown in FIG. 3, the second reset sub-circuit 18 may include a sixth thin film transistor TFT6, a first terminal of the sixth thin film transistor TFT6 is coupled to the input terminal C of the light-emitting element 2, a second terminal of the sixth thin film transistor TFT6 is coupled to the output terminal D of the fingerprint detection element 3, and a control terminal of the sixth thin film transistor TFT6 is coupled to the reset control terminal COMP. As shown in FIG. 4, during the reset period T1, the reset control signal can be output to the reset control terminal COMP, so that the third thin film transistor TFT3 is turned on and the sixth thin film transistor TFT6 is turned on; and during the reset period T1, the reset signal is output to the control signal terminal EM, so that the reset signal is applied to the output terminal D of the fingerprint detection element 3.

The first thin film transistor TFT1, the second thin film transistor TFT2, the third thin film transistor TFT3, the fourth thin film transistor TFT4, the fifth thin film transistor TFT5, and the sixth thin film transistor TFT6 may be all N-type thin film transistors or all P-type thin film transistors.

In the following, the driving circuit 1 and the driving method thereof will be further explained and illustrated by taking an embodiment of the driving circuit 1 of the present disclosure as an example.

In the embodiment, as shown in FIG. 3, the driving circuit 1 includes:

the first thin film transistor TFT1 as the driving sub-circuit 11, with the first terminal coupled to the first voltage terminal B, the second terminal coupled to the input terminal C of the light-emitting element 2, and the control terminal coupled to the driving node A;

the second thin film transistor TFT2 as the data writing sub-circuit 12, with the first terminal coupled to the driving node A, the second terminal coupled to the input terminal C of the light-emitting element 2, and the control terminal coupled to the scanning signal terminal SCAN[n];

the third thin film transistor TFT3 as the first reset sub-circuit 17, with the first terminal coupled to the control signal terminal EM, the second terminal coupled to the input terminal C of the light-emitting element 2, and the control terminal coupled to the reset control terminal COMP;

the first capacitor C1 as the first energy storage sub-circuit 13, with the first terminal coupled to the driving node A, and the second terminal coupled to the control signal terminal EM;

the second capacitor C2 as the second energy storage sub-circuit 16, with the first terminal coupled to the input terminal C of the light-emitting element 2, and the second terminal coupled to the data input terminal DATA;

the fourth thin film transistor TFT4 as the detection sub-circuit 14, with the first terminal coupled to the first voltage terminal B, and the control terminal coupled to the output terminal D of the fingerprint detection element 3;

the fifth thin film transistor TFT5 as the data output sub-circuit 15, with the first terminal coupled to the second terminal of the fourth thin film transistor TFT4, the second terminal coupled to the data output terminal OUT, and the control terminal coupled to the scanning signal terminal SCAN[n]; and the sixth thin film transistor TFT6 as the second reset sub-circuit 18, with the first terminal coupled to the input terminal C of the light-emitting element 2, the second terminal coupled to the output terminal D of the fingerprint detection element 3, and the control terminal coupled to the reset control terminal COMP.

The first thin film transistor TFT1, the second thin film transistor TFT2, the third thin film transistor TFT3, the fourth thin film transistor TFT4, the fifth thin film transistor TFT5 and the sixth thin film transistor TFT6 are all N-type thin film transistors.

As shown in FIG. 4, the driving circuit 1 may be driven according to the following timing and method.

In step S110, during a reset time T1, a reset signal is output to the control signal terminal EM, where the reset signal is at a low level and the voltage value thereof is $V_{int}$, and thus the voltage at the second terminal of the first capacitor C1 is reset to $V_{int}$. At the same time, a reset control signal is output to the reset control terminal COMP, so that the third thin film transistor TFT3 and the sixth thin film transistor TFT6 are turned on, and thus the reset signal is applied to the output terminal D of the fingerprint detection element 3, and the voltage at the output terminal D of the fingerprint detection element 3 is reset to $V_{int}$. At the same time, a scanning signal is output to the scanning signal terminal SCAN[n], so that the second thin film transistor TFT2 is turned on, and thus the reset signal is applied to the driving node A, and the voltage at the driving node A is reset to $V_{int}$. At the same time, a first voltage is output to the first voltage terminal B, the first voltage is at a high level and the voltage value thereof is V1, and thus the first thin film transistor TFT1 is not turned on, and the light-emitting element 2 does not emit light.

In step S120, during a threshold compensation period T2 after the reset period T1, the scanning signal is output to the scanning signal terminal SCAN[n], and thus the second thin film transistor TFT2 is turned on, and the second terminal of the first thin film transistor TFT1 and the driving node A are connected. A second voltage is output to the first voltage terminal B, where the second voltage is at a low level and the voltage value thereof is $V_2$ so that $V_{int}$-$V_2$ is greater than the threshold voltage $V_{th}$ of the first thin film transistor TFT1. Therefore, the first thin film transistor TFT1 will be on until the voltage value of the driving node A is changed to $V_2$+$V_{th}$, and thus the compensation of the threshold voltage of the first thin film transistor TFT1 is achieved. In an embodiment, $V_2$ may be not greater than a voltage value $V_E$ of the output terminal E of the light-emitting element 2.

In step S130, during a scanning period T4[n] after the threshold compensation period T2, the scanning signal is output to the scanning signal terminal SCAN[n], so that the second thin film transistor TFT2 and the fifth thin film transistor TFT5 are turned on.

The first voltage is output to the first voltage terminal B, and thus the voltage value of the first voltage terminal B is $V_1$ so that the first thin film transistor TFT1 is not turned on during the scanning period T4[n].

A data signal is output to the data input terminal DATA, where the voltage value of the data signal is $V_{data}$, so that the voltage of the driving node A becomes $V_A$. Since the total amount of charges of the first capacitor C1 and the second capacitor C2 does not change, that is, $C_1(V_2+V_{th}-V_{int})+C_2(V_2+V_{th}-V_{ref})=C_1(V_A-V_{int})+C_2(V_A-V_{data})$, the voltage of the driving node A can be calculated by $V_A=V_2+V_{th}+C_2/(C_1+C_2)*(V_{data}-V_{ref})$, where $V_{ref}$ is a reference voltage of the data writing terminal, $C_1$ is a capacitance of the first capacitor C1, C2 is the capacitance of the second capacitor C2, and C1 and C2 are constants. Since $V_2$ and $V_{ref}$ are known, the voltage $V_A$ of the driving node A is only related to $V_{data}$, which realizes writing the data signal to the driving node A.

Further, during the scanning period T4 [n], the fingerprint detection element 3 generates a voltage in response to a detection signal reflected by a finger and received by the fingerprint detecting element 3, so that the output terminal D of the fingerprint detection element 3 has the voltage. The fourth thin film transistor TFT4 may be used as an amplifier to generate a detection current in response to the voltage of the output terminal D of the fingerprint detection element 3. The magnitude of the detection current is related to the voltage of the output terminal D of the fingerprint detection element 3. The detection current is output to the data output terminal OUT through the fifth thin film transistor TFT5, which realizes the outputting of the detection current for fingerprint recognition to the data output terminal OUT.

In step S140, during a light-emitting period T5 after the scanning period T4[n], the first voltage is output to the first voltage terminal B, so that the voltage of the first voltage terminal B is maintained at $V_2$. A light-emitting signal is output to the control signal terminal EM, where the light-emitting signal is at a high level and the voltage value thereof is $V_3$. Therefore, the voltage value of the second terminal of the first capacitor C1 is $V_3$, and the first capacitor C1 bootstraps under a coupling action, so that the voltage of the driving node A is changed and the first thin film transistor TFT1 is turned on. The voltage value $V_{gate}$ of the driving node A is:

$$V_{gate}=V_A+V_3-V_{int}=V_2+V_{th}+C_2/(C_1+C_2)*(V_{data}-V_{ref})+V_3-V_{int}.$$

At this time, a gate-source voltage of the first thin film transistor TFT1 is $V_{GS}=V_{gate}-V_1$, and then the light-emitting driving current of the first thin film transistor TFT1 is $I=\beta(V_2+C_2/(C_1+C_2)*(V_{data}-V_{ref})+V_3-V_{int}-V_1)$, which is only related to $V_{data}$. $\beta$ is a constant of the first thin film transistor TFT1, where $$\beta = \frac{1}{2}\mu_n C_{OX}\left(\frac{W}{L}\right),$$

$\mu_n$ is the electron mobility of the first thin film transistor TFT1, $C_{ox}$ is the insulation capacitance per unit area, and W/L is the width-to-length ratio of the first thin film transistor TFT1.

In an embodiment, $V_3=V_1$ and $V_2=V_{int}$, so the types of voltages required to drive the driving circuit 1 may be reduced, the types of power supply voltages coupled to the driving circuit 1 may be reduced, and thus the complexity of structure of the display device using the driving circuit 1 may be reduced.

Figure 5:
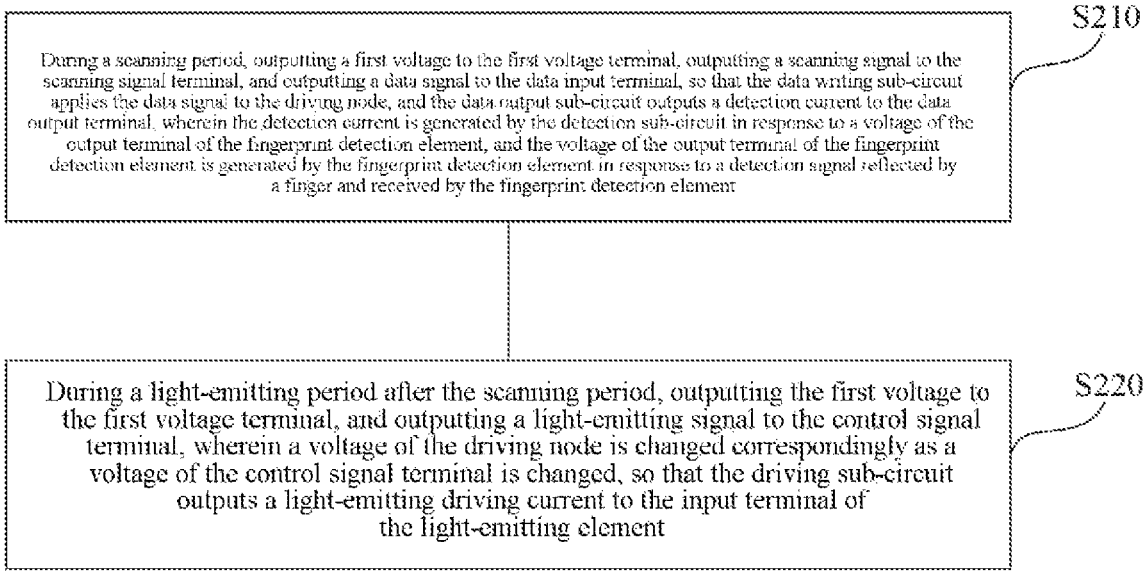
FIG. 5 is a schematic flowchart of a driving method of a driving circuit according to an embodiment of the present disclosure.

The present disclosure also provides a driving method of the driving circuit 1 for driving any one of the driving circuits 1 described in the above embodiments. As shown in FIG. 5, the driving method of the driving circuit 1 includes:

step S210, during a scanning period T4[n], outputting a first voltage to the first voltage terminal, outputting a scanning signal to the scanning signal terminal SCAN[n], and outputting a data signal to the data input terminal DATA, so that the data writing sub-circuit 12 applies the data signal to the driving node A, and the data output sub-circuit 15 outputs a detection current to the data output terminal OUT, wherein the detection current is generated by the detection sub-circuit 14 in response to a voltage of the output terminal D of the fingerprint detection element 3, and the voltage of the output terminal D of the fingerprint detection element 3 is generated by the fingerprint detection element 3 in response to a detection signal reflected by a finger and received by the fingerprint detection element 3; and step S220, during a light-emitting period T5 after the scanning period SCAN[n], outputting the first voltage to the first voltage terminal B, and outputting a light-emitting signal to the control signal terminal EM, wherein a voltage of the driving node A is changed correspondingly as a voltage of the control signal terminal EM is changed, so that the driving sub-circuit 11 outputs a light-emitting driving current to the light-emitting element 2.

In an embodiment, the driving circuit 1 further includes the second energy storage sub-circuit 16 coupled to the data writing sub-circuit 12 and the data input terminal DATA, and the data writing sub-circuit 12 is further coupled to the input terminal C of the light-emitting element 2, and is configured to communicate the input terminal C of the light-emitting element 2 with the driving node A in response to the scanning signal of the scanning signal terminal SCAN[n]. The driving method of the driving circuit 1 further includes:

step S300, during a threshold compensation period T2 before the scanning period T4[n], outputting a second voltage to the first voltage terminal B to change a potential difference between the driving node A and the first voltage terminal B, so that the driving sub-circuit 11 outputs a current; and outputting the scanning signal to the scanning signal terminal SCAN[n], so that the current flows through the data writing sub-circuit 12 to change a electromotive force of the driving node A until the driving sub-circuit 11 is turned off.

In an embodiment, the driving circuit 1 further includes: the first reset sub-circuit 17 coupled to the control signal terminal EM, a reset control terminal COMP and the driving node A, and configured to output a signal of the control signal terminal EM to the driving node A in response to a reset control signal of the reset control terminal COMP; and the second reset sub-circuit coupled to the control signal terminal EM, the reset control terminal COMP and the output terminal D of the fingerprint detection element 3, and configured to output the signal of the control signal terminal EM to the output terminal D of the fingerprint detection element 3 in response to the reset control signal of the reset control terminal COMP. The driving method of the driving circuit 1 further includes:

step S400, during a reset period T1 before the threshold compensation period T2, outputting a reset signal to the control signal terminal EM, and outputting the reset control signal to the reset control terminal COMP, so that the reset signal is applied to the driving node A and the output terminal D of the fingerprint detection element 3.

In an embodiment, the first reset sub-circuit 17 is coupled to the input terminal C of the light-emitting element 2, and is coupled to the driving node A through the data writing sub-circuit 12. The driving method further includes:

step 500, during the reset period T1, outputting the scanning signal to the scanning signal terminal SCAN[n], so that the reset signal is applied to the driving node A through the first reset sub-circuit 17 and the data writing sub-circuit 12.

Various details and beneficial effects of the driving method of the driving circuit 1 provided by the present disclosure have been described in detail in the above embodiment of the driving circuit, which will not be repeated herein.

It should be noted that although the steps of the driving method in the present disclosure are described in a specific order in the drawings, it does not require or imply that the steps must be performed in the specific order, or all the steps shown must be performed in order to achieve the desired result. Additionally or alternatively, some steps may be omitted, some steps may be combined into one step for execution, and/or one step may be decomposed into multiple steps for execution, etc., all of which shall be considered as part of the present disclosure.

Figure 6:
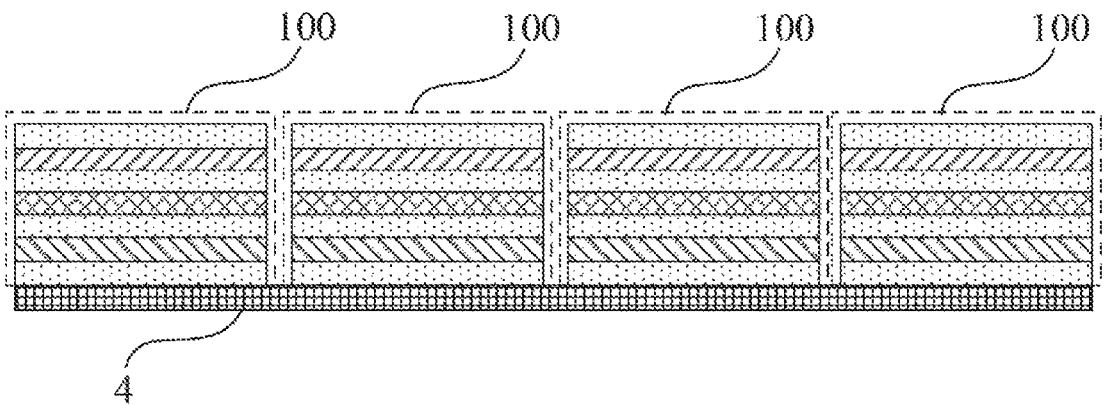
FIG. 6 is a schematic structural diagram of an array substrate according to an embodiment of the present disclosure.

The present disclosure also provides an array substrate. As shown in FIG. 6, the array substrate includes a plurality of display modules 100 arranged in an array. Any display modules 100 includes the light-emitting element 2, the fingerprint detection element 3, and the driving circuit 1 described in the above embodiments.

The light-emitting element 2 has an input terminal and an output terminal. The input terminal C of the light-emitting element 2 is coupled to the driving sub-circuit 11 of the driving circuit 1, and the output terminal E of the light-emitting element 2 is coupled to the second voltage terminal. The fingerprint detection element 3 has the output terminal D coupled to the detection sub-circuit 14.

The driving circuit 1 used in the array substrate of the embodiment of the present disclosure is the same as the driving circuit 1 in the above-mentioned driving circuit embodiments, and thus has the same beneficial effects, which will not be repeated herein.

The light-emitting element 2 may be an OLED (Organic Light-Emitting Diode) light-emitting element 2, an LED (Light-Emitting Diode) light-emitting element 2, a quantum dot light-emitting element 2, or other types of light-emitting elements 2, which can emit light under control.

The fingerprint detection element 3 is used to output a detection signal, receive a detection signal reflected by a finger, and convert the received detection signal of the finger into a voltage signal. The fingerprint detection element 3 may be an ultrasonic fingerprint sensor, an optical fingerprint sensor, or other types of fingerprint detection element 3.

In the following, one of embodiments of the display module 100 is taken as an example to further explain and explain the structure of the array substrate of the present disclosure.

Figure 7:
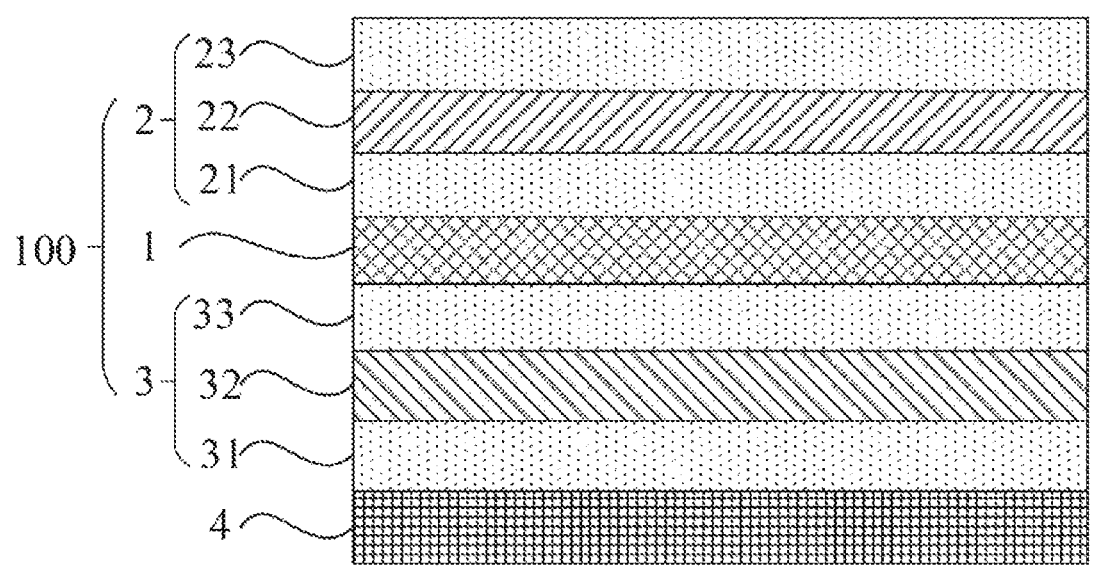
FIG. 7 is a schematic structural diagram of a display module according to an embodiment of the present disclosure.

In the embodiment, as shown in FIG. 7, the display module 100 includes an ultrasonic fingerprint sensor, a driving circuit 1 and an OLED light-emitting element 2.

The ultrasonic fingerprint sensor includes a first electrode 31, a piezoelectric material layer 32, and a second electrode 33. The first electrode 31 is provided on a side of a base substrate 4, the piezoelectric material layer 32 is provided on a side of the first electrode 31 away from the base substrate 4, and the second electrode 33 is provided on a side of the piezoelectric material layer 32 away from the base substrate 4. The first electrode 31 is used as an input terminal of the ultrasonic fingerprint sensor for applying the detection control signal to the piezoelectric material layer 32, so that the piezoelectric material layer 32 generates ultrasonic waves. The ultrasonic wave as a detection signal is applied to the piezoelectric material layer 32 after being reflected by a finger, so that a voltage is generated on the piezoelectric material layer 32, and is applied to the second electrode 33 as the output terminal of the ultrasonic fingerprint sensor.

The driving circuit 1 is provided on a side of the second electrode 33 away from the base substrate 4, and the detection sub-circuit 14 of the driving circuit 1 is coupled to the second electrode 33.

The OLED light-emitting element 2 includes a third electrode 52, an electroluminescent layer 22, and a fourth electrode 23. The third electrode 52 is provided on a side of the driving circuit 1 away from the base substrate 4, and is coupled to the driving sub-circuit 11 of the driving circuit 1 as the input terminal C of the OLED light-emitting element 2; the electroluminescent layer 22 is provided on a side of the third electrode 52 away from the base substrate 4 to emit light under the action of a light-emitting driving current; and the fourth electrode 23 is used as the output terminal E of the OLED light-emitting element 2 and is provided on a side of the electroluminescent layer 22 away from the base substrate 4.

The present disclosure also provides a display device including the array substrate described in the above array substrate embodiments. The display device may be a mobile phone screen, a notebook computer screen, an automatic counter machine interactive screen, or other types of display devices, which is not specifically limited in the present disclosure.

The array substrate used in the display device of the embodiment of the present disclosure is the same as the array substrate in the above-mentioned array substrate embodiments. Therefore, it has the same beneficial effects, which will not be repeated herein.

Figure 8:
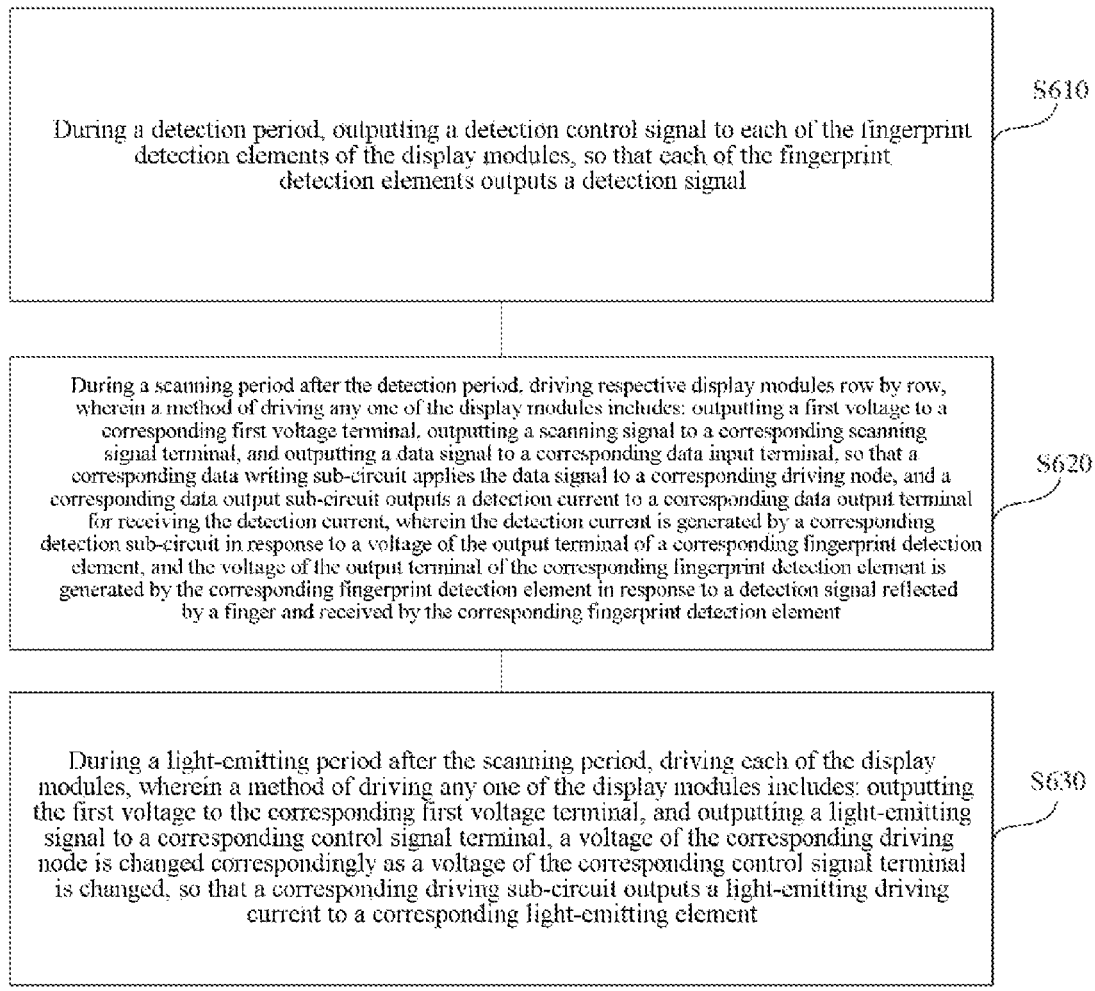
FIG. 8 is a schematic flowchart of a driving method of a display device according to an embodiment of the present disclosure.
Figure 9:
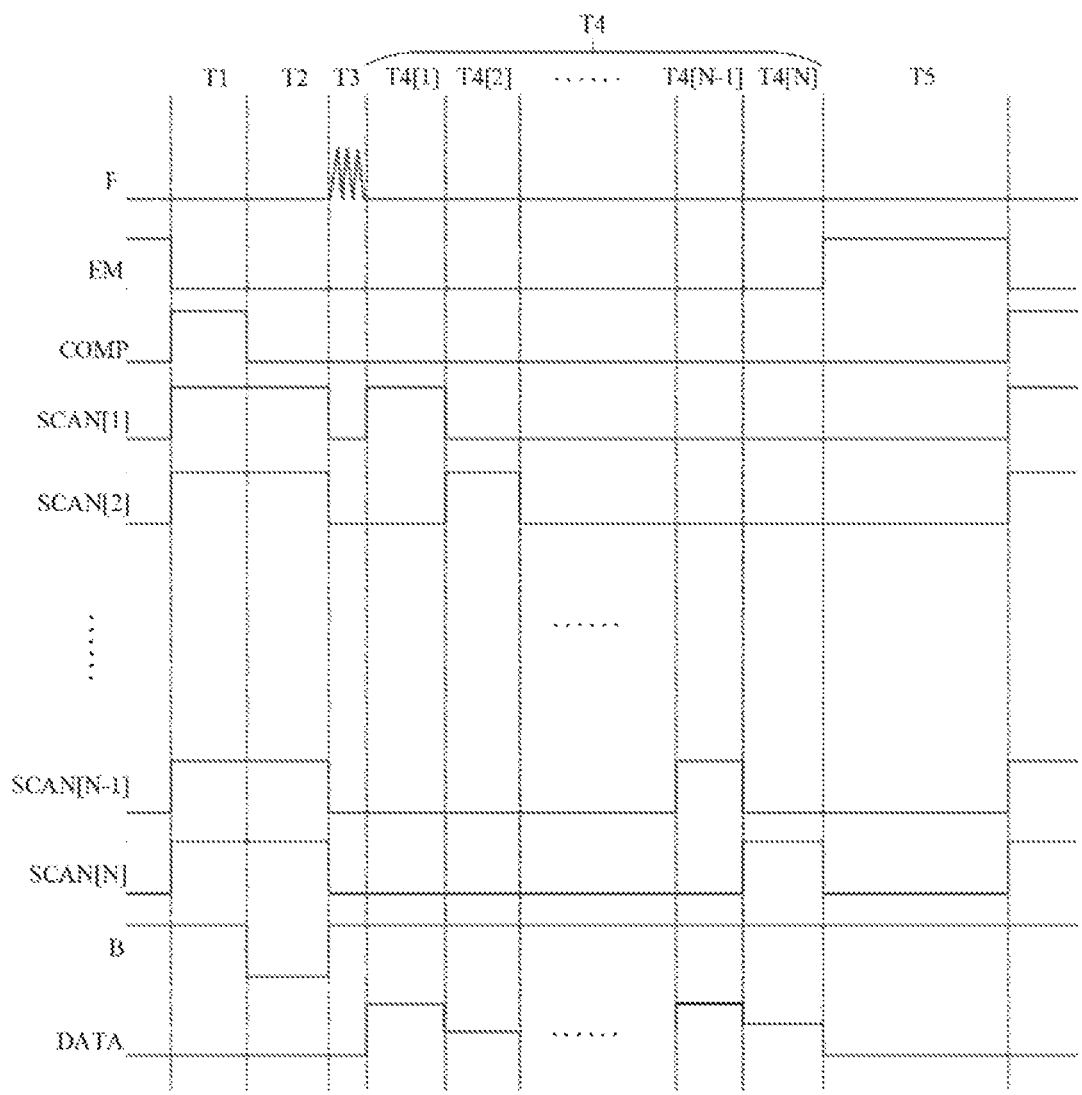
FIG. 9 is a schematic diagram of timing control of a display device according to an embodiment of the present disclosure.

The present disclosure also provides a driving method of a display device, which is applied to the display device described in the above display device embodiments. As shown in FIGS. 8 and 9, the driving method of the display device includes:

step S610, during a detection period T3, outputting a detection control signal to each of the fingerprint detection elements 3 of the display modules 100, so that each of the fingerprint detection elements 3 outputs a detection signal;

step S620, during a scanning period T4 after the detection period T3, driving respective display modules 100 row by row, wherein a method of driving any one of the display modules 100 includes: outputting a first voltage to a corresponding first voltage terminal B, outputting a scanning signal to a corresponding scanning signal terminal SCAN[n] (SCAN[n] is one of SCAN[1]~SCAN[N], where N is the total number of rows of the scanning signal terminals), and outputting a data signal to a corresponding data input terminal DATA, so that a corresponding data writing sub-circuit 12 applies the data signal to a corresponding driving node A, and a corresponding data output sub-circuit 15 outputs a detection current to a corresponding data output terminal OUT, wherein the detection current is generated by a corresponding detection sub-circuit 14 in response to a voltage of the output terminal D of a corresponding fingerprint detection element 3, and the voltage of the output terminal D of the corresponding fingerprint detection element 3 is generated by the corresponding fingerprint detection element 3 in response to a detection signal reflected by a finger and received by the corresponding fingerprint detection element 3;

step S630, during a light-emitting period T5 after the scanning period, driving each of the display modules 100, wherein a method of driving any one of the display modules 100 includes: outputting the first voltage to the corresponding first voltage terminal B, and outputting a light-emitting signal to a corresponding control signal terminal EM, a voltage of the corresponding driving node A is changed correspondingly as a voltage of the corresponding control signal terminal EM is changed, so that a corresponding driving sub-circuit 11 outputs a light-emitting driving current to a corresponding light-emitting element 2.

It can be understood that the corresponding first voltage terminal B is the first voltage terminal B of the driving circuit 1 of the display module 100 to be driven; the corresponding scanning signal terminal SCAN[n] is the scanning signal terminal SCAN[n] of the driving circuit 1 of the display module 100 to be driven; the corresponding data input terminal DATA is the data input terminal DATA of the driving circuit 1 of the display module 100 to be driven; the corresponding data writing sub-circuit 12 is the data writing sub-circuit 12 of the driving circuit 1 of the display module 100 to be driven; the corresponding driving node A is the driving node A of the driving circuit 1 of the display module 100 to be driven; the corresponding data output sub-circuit 15 is the data output sub-circuit 15 of the driving circuit 1 of the display module 100 to be driven; the corresponding data output terminal OUT is the data output terminal OUT of the driving circuit 1 of the display module 100 to be driven; the corresponding detection sub-circuit 14 is the detection sub-circuit 14 of the driving circuit 1 of the display module 100 to be driven; the corresponding control signal terminal EM is the control signal terminal EM of the driving circuit 1 of the display module 100 to be driven; the corresponding driving sub-circuit 11 is the driving sub-circuit 11 of the driving circuit 1 of the display module 100 to be driven; the corresponding light-emitting element 2 is the light-emitting element 2 of the display module 100 to be driven; and the corresponding fingerprint detection element 3 is the fingerprint detection element 3 of the display module 100 to be driven.

When the display device is driven by the driving method of the display device provided by the present disclosure, the respective display modules 100 of the display device may simultaneously output detection signals during the display period; then the respective display modules 100 are scanned row by row during the scanning period, wherein when any of the display modules 100 is selected by the scanning signal, the data signal writing and the detection current outputting may be performed simultaneously; and the light-emitting elements 2 of the respective display modules 100 may emit light at the same time during the light-emitting period.

In an embodiment, the driving circuit 1 of any one of the display modules 100 further includes a second energy storage sub-circuit 16 coupled to the corresponding data writing sub-circuit 12 and the corresponding data input terminal DATA, and the corresponding data writing sub-circuit 12 is further coupled to the input terminal C of the corresponding light-emitting element 2, and is configured to communicate the input terminal C of the corresponding light-emitting element 2 with the corresponding driving node A in response to the scanning signal of the corresponding scanning signal terminal SCAN[n]. The driving method of the display device further includes:

step S700, during a threshold compensation period T2 before the detection period T3, performing threshold compensation on each of the display modules 100, wherein a method of performing the threshold compensation on any one of the display modules 100 includes: outputting a second voltage to the corresponding first voltage terminal B to change a potential difference between the corresponding driving node A and the corresponding first voltage terminal B, so that the corresponding driving sub-circuit 11 outputs a current; and outputting the scanning signal to the corresponding scanning signal terminal SCAN[n], so that the current flows through the corresponding data writing sub-circuit 12 to change a electromotive force of the corresponding driving node A until the corresponding driving sub-circuit 11 is turned off.

When the display device is driven by the driving method of the display device provided by the present disclosure, the threshold value compensation may be simultaneously performed on the driving circuits 1 of the respective display modules 100 during the threshold compensation period T2, which simplifies the driving method of the driving device.

In an embodiment, the driving circuit 1 of any one of the display modules 100 further includes: a first reset sub-circuit 17 coupled to the control signal terminal EM, a reset control terminal COMP and the driving node A, and configured to output a signal of the control signal terminal EM to the driving node A in response to a reset control signal of the reset control terminal COMP; and a second reset sub-circuit 18 coupled to the control signal terminal EM, the reset control terminal COMP and the output terminal D of the fingerprint detection element 3, and configured to output the signal of the control signal terminal EM to the output terminal D of the fingerprint detection element 3 in response to the reset control signal of the reset control terminal COMP. The driving method of the display device further includes:

step S800, during a reset period T1 before the threshold compensation period T2, resetting each of the display modules 100, wherein a method of resetting any one of the display modules 100 includes outputting a reset signal to the corresponding control signal terminal EM, and outputting the reset control signal to a corresponding reset control terminal COMP, so that the reset signal is applied to the corresponding driving node A and the output terminal D of the corresponding fingerprint detection element 3.

It can be understood that the corresponding reset control terminal COMP is the reset control terminal COMP of the driving circuit 1 of the display module 100 to be driven.

When the display device is driven by the driving method of the display device provided by the present disclosure, the driving nodes A of the respective display modules 100 may be reset at the same time during the reset period, and the output terminals D of the fingerprint detection elements 3 of the respective display modules 100 may be reset at the same time.

In an embodiment, in the driving circuit 1 of each of the display modules 100, the first reset sub-circuit 17 is coupled to the input terminal C of the light-emitting element 2, and is coupled to the driving node A through the data writing sub-circuit 12, and the driving method of the display device further includes:

step S900, during the reset period T1, outputting the scanning signal to the scanning signal terminal SCAN[n] of each of the display modules 100. In this way, the reset signal is applied to the corresponding driving node A through the input terminal C of the corresponding light-emitting element 2 and the corresponding data writing sub-circuit 12.

In the driving method of the display device of the present disclosure, the specific details and effects of the driving method of any of the display modules 100 are described in detail in the embodiment of the driving method of the driving circuit 1, which are not repeated herein.

It should be noted that although the steps of the method in the present disclosure are described in a specific order in the drawings, it does not require or imply that the steps must be performed in the specific order, or all the steps shown must be performed to achieve the desired result. Additionally or alternatively, some steps may be omitted, a plurality of steps may be combined into one step for execution, and/or one step may be divided into a plurality of steps for execution, etc., all of which shall be considered as part of the present disclosure.

It should be understood that the present disclosure does not limit the application thereof to the detailed structure and arrangement of the components in this specification. The present disclosure may have other embodiments, and may be implemented and executed in various ways. The aforementioned variations and modifications fall within the scope of the present disclosure. It should be understood that the present disclosure disclosed and defined in this specification extends to include all alternative combinations of two or more individual features mentioned or evident in the text and/or drawings. All of these different combinations constitute various alternative aspects of the present disclosure. The embodiments described in this specification illustrate the best modes known for implementing the present disclosure, and will enable those skilled in the art to utilize the present disclosure.

What is claimed is:

1. A driving circuit for driving a light-emitting element and a fingerprint detection element, comprising:
    a driving sub-circuit coupled to a first voltage terminal, a driving node, and an input terminal of the light-emitting element, and configured to output a light-emitting driving current to the input terminal of the light-emitting element under the control of the driving node;
    a data writing sub-circuit coupled to the driving node, a scanning signal terminal, and a data input terminal, and configured to communicate the data input terminal with the driving node in response to a scanning signal of the scanning signal terminal;
    a first energy storage sub-circuit coupled to the driving node and a control signal terminal;
    a detection sub-circuit coupled to the first voltage terminal and an output terminal of the fingerprint detection element, and configured to output a detection current under the control of the output terminal of the fingerprint detection element; and
    a data output sub-circuit coupled to the detection sub-circuit, the scanning signal terminal, and a data output terminal, and configured to output the detection current to the data output terminal in response to the scanning signal of the scanning signal terminal.

2. The driving circuit according to claim 1, further comprising:
    a second energy storage sub-circuit coupled to the data writing sub-circuit and the data input terminal,
    wherein the data writing sub-circuit is further coupled to the input terminal of the light-emitting element, and is configured to communicate the input terminal of the light-emitting element with the driving node in response to the scanning signal of the scanning signal terminal.

3. The driving circuit according to claim 2, further comprising:
    a first reset sub-circuit coupled to the control signal terminal, a reset control terminal, and the input terminal of the light-emitting element; and
    a second reset sub-circuit coupled to the first reset sub-circuit, the reset control terminal, and the output terminal of the fingerprint detection element, and configured to output the signal of the control signal terminal transmitted through the first reset sub-circuit to the output terminal of the fingerprint detection element in response to a reset control signal of the reset control terminal.

4. The driving circuit according to claim 3, wherein:
    the driving sub-circuit comprises a first thin film transistor, and the first thin film transistor comprises a first terminal coupled to the first voltage terminal, a second terminal coupled to the input terminal of the light-emitting element, and a control terminal coupled to the driving node;
    the data writing sub-circuit comprises a second thin film transistor, and the second thin film transistor comprises a first terminal coupled to the driving node, a second terminal coupled to the input terminal of the light-emitting element, and a control terminal coupled to the scanning signal terminal;
    the first reset sub-circuit comprises a third thin film transistor, and the third thin film transistor comprises a first terminal coupled to the control signal terminal, a second terminal coupled to the input terminal of the light-emitting element, and a control terminal coupled to the reset control terminal;
    the first energy storage sub-circuit comprises a first capacitor, and the first capacitor comprises a first terminal coupled to the driving node and a second terminal coupled to the control signal terminal;
    the second energy storage sub-circuit comprises a second capacitor, and the second capacitor comprises a first terminal coupled to the input terminal of the light-emitting element and a second terminal coupled to the data input terminal;
    the detection sub-circuit comprises a fourth thin film transistor, and the fourth thin film transistor comprises a first terminal coupled to the first voltage terminal and a control terminal coupled to the output terminal of the fingerprint detection element;
    the data output sub-circuit comprises a fifth thin film transistor, and the fifth thin film transistor comprises a first terminal coupled to a second terminal of the fourth thin film transistor, a second terminal coupled to the data output terminal, and a control terminal coupled to the scanning signal terminal; and
    the second reset sub-circuit comprises a sixth thin film transistor, and the sixth thin film transistor comprises a first terminal coupled to the input terminal of the light-emitting element, a second terminal coupled to the output terminal of the fingerprint detection element, and a control terminal coupled to the reset control terminal.

5. The driving circuit according to claim 1, wherein the driving sub-circuit comprises a first thin film transistor, and the first thin film transistor comprises a first terminal coupled to the first voltage terminal, a second terminal coupled to the input terminal of the light-emitting element, and a control terminal coupled to the driving node.

6. The driving circuit according to claim 1, wherein the data writing sub-circuit comprises a second thin film transistor, and the second thin film transistor comprises a first terminal coupled to the driving node, a second terminal coupled to the data input terminal, and a control terminal coupled to the scanning signal terminal.

7. The driving circuit according to claim 1, wherein the first energy storage sub-circuit comprises a first capacitor, and the first capacitor comprises a first terminal coupled to the driving node and a second terminal coupled to the control signal terminal.

8. The driving circuit according to claim 1, wherein the detection sub-circuit comprises a fourth thin film transistor, and the fourth thin film transistor comprises a first terminal coupled to the first voltage terminal, a control terminal coupled to the output terminal of the fingerprint detection element, and a second terminal coupled to the data output sub-circuit.

9. The driving circuit according to claim 1, wherein the data output sub-circuit comprises a fifth thin film transistor, and the fifth thin film transistor comprises a first terminal coupled to the detection sub-circuit, a second terminal coupled to the data output terminal, and a control terminal coupled to the scanning signal terminal.

10. The driving circuit according to claim 1, wherein:
the driving circuit is implemented in an at least one of a plurality of display modules arranged in an array of an array substrate;
the light-emitting element has the input terminal coupled to the driving sub-circuit of the driving circuit and an output terminal coupled to a second voltage terminal; and
the fingerprint detection element has the output terminal coupled to the detection sub-circuit.

11. The driving circuit according to claim 10, wherein the fingerprint detection element is an ultrasonic fingerprint sensor.

12. The driving circuit according to claim 10, wherein the array substrate is implemented in a display device.

13. A driving method of a driving circuit for driving a driving circuit that is configured to drive a light-emitting element and a fingerprint detection element, wherein the driving circuit comprises:
a driving sub-circuit coupled to a first voltage terminal, a driving node, and an input terminal of the light-emitting element, and configured to output a light-emitting driving current to the input terminal of the light-emitting element under the control of the driving node;
a data writing sub-circuit coupled to the driving node, a scanning signal terminal, and a data input terminal, and configured to communicate the data input terminal with the driving node in response to a scanning signal of the scanning signal terminal;
a first energy storage sub-circuit coupled to the driving node and a control signal terminal;
a detection sub-circuit coupled to the first voltage terminal and an output terminal of the fingerprint detection element, and configured to output a detection current under the control of the output terminal of the fingerprint detection element and
a data output sub-circuit coupled to the detection sub-circuit, the scanning signal terminal, and a data output terminal, and configured to output the detection current to the data output terminal in response to the scanning signal of the scanning signal terminal
wherein the driving method comprises:
during a scanning period, outputting a first voltage to the first voltage terminal, outputting a scanning signal to the scanning signal terminal, and outputting a data signal to the data input terminal so that the data writing sub-circuit applies the data signal to the driving node, and the data output sub-circuit outputs a detection current to the data output terminal, wherein the detection current is generated by the detection sub-circuit in response to a voltage of the output terminal of the fingerprint detection element, and the voltage of the output terminal of the fingerprint detection element is generated by the fingerprint detection element in response to a detection signal reflected by a finger and received by the fingerprint detection element; and
during a light-emitting period after the scanning period, outputting the first voltage to the first voltage terminal, and outputting a light-emitting signal to the control signal terminal, wherein a voltage of the driving node is changed correspondingly as a voltage of the control signal terminal is changed, so that the driving sub-circuit outputs a light-emitting driving current to the input terminal of the light-emitting element.

14. The driving method of the driving circuit according to claim 13, wherein:
the driving circuit further comprises a second energy storage sub-circuit coupled to the data writing sub-circuit and the data input terminal, and the data writing sub-circuit is further coupled to the input terminal of the light-emitting element, and is configured to communicate the input terminal of the light-emitting element with the driving node in response to the scanning signal of the scanning signal terminal; and
the driving method of the driving circuit further comprises, during a threshold compensation period before the scanning period, outputting a second voltage to the first voltage terminal to change a potential difference between the driving node and the first voltage terminal, so that the driving sub-circuit outputs a current; and outputting the scanning signal to the scanning signal terminal, so that the current flows through the data writing sub-circuit to change a electromotive force of the driving node until the driving sub-circuit is turned off.

15. The driving method of the driving circuit according to claim 14, wherein:
the driving circuit further comprises:
a first reset sub-circuit coupled to the control signal terminal, a reset control terminal, and the input terminal of the light-emitting element; and
a second reset sub-circuit coupled to the first reset sub-circuit, the reset control terminal, and the output terminal of the fingerprint detection element, and configured to output the signal of the control signal terminal transmitted through the first reset sub-circuit to the output terminal of the fingerprint detection element in response to a reset control signal of the reset control terminal; and
the driving method of the driving circuit further comprises, during a reset period before the threshold compensation period, outputting a reset signal to the control signal terminal, and outputting the reset control signal to the reset control terminal, so that the reset signal is applied to the input terminal of the light-emitting element and the output terminal of the fingerprint detection element.

16. The driving method of the driving circuit according to claim 15, wherein:
the first reset sub-circuit is coupled to the input terminal of the light-emitting element; and
the driving method further comprises, during the reset period, outputting the scanning signal to the scanning signal terminal, so that the reset signal is applied to the driving node through the first reset sub-circuit and the data writing sub-circuit.

17. A driving method for driving a display device comprising an array substrate, wherein:
the array substrate comprises a plurality of display modules arranged in an array, and at least one of the display modules comprises a driving circuit, a light-emitting element, and a fingerprint detection element;
the driving circuit is configured to drive the light-emitting element and the fingerprint detection element, and comprises:
a driving sub-circuit coupled to a first voltage terminal, a driving node, and an input terminal of the light-emitting element, and configured to output a light-emitting driving current to the input terminal of the light-emitting element under the control of the driving node;
a data writing sub-circuit coupled to the driving node, a scanning signal terminal, and a data input terminal, and configured to communicate the data input terminal with the driving node in response to a scanning signal of the scanning signal terminal;
a first energy storage sub-circuit coupled to the driving node and a control signal terminal;
a detection sub-circuit coupled to the first voltage terminal and an output terminal of the fingerprint detection element, and configured to output a detection current under the control of the output terminal of the fingerprint detection element; and
a data output sub-circuit coupled to the detection sub-circuit, the scanning signal terminal, and a data output terminal, and configured to output the detection current to the data output terminal in response to the scanning signal of the scanning signal terminal;
the light-emitting element has an output terminal coupled to a second voltage terminal; and
the driving method comprises:
during a detection period, outputting a detection control signal to each of the fingerprint detection elements of the display modules, so that each of the fingerprint detection elements outputs a detection signal;
during a scanning period after the detection period, driving respective ones of the display modules row by row by: outputting a first voltage to a corresponding first voltage terminal, outputting a scanning signal to a corresponding scanning signal terminal, and outputting a data signal to a corresponding data input terminal, so that a corresponding data writing sub-circuit applies the data signal to a corresponding driving node, and a corresponding data output sub-circuit outputs a detection current to a corresponding data output terminal, wherein the detection current is generated by a corresponding detection sub-circuit in response to a voltage of the output terminal of a corresponding fingerprint detection element, and the voltage of the output terminal of the corresponding fingerprint detection element is generated by the corresponding fingerprint detection element in response to a detection signal reflected by a finger and received by the corresponding fingerprint detection element; and
during a light-emitting period after the scanning period, driving each of the display modules by: outputting the first voltage to the corresponding first voltage terminal, and outputting a light-emitting signal to a corresponding control signal terminal, a voltage of the corresponding driving node is changed correspondingly as a voltage of the corresponding control signal terminal is changed, so that a corresponding driving sub-circuit outputs a light-emitting driving current to the input terminal of a corresponding light-emitting element.

18. The driving method according to claim 17, wherein:
the driving circuit of the at least one of the display modules further comprises a second energy storage sub-circuit coupled to the corresponding data writing sub-circuit and the corresponding data input terminal, and the corresponding data writing sub-circuit is further coupled to the input terminal of the corresponding light-emitting element, and is configured to communicate the input terminal of the corresponding light-emitting element with the corresponding driving node in response to the scanning signal of the corresponding scanning signal terminal; and
the driving method further comprises, during a threshold compensation period before the detection period, performing threshold compensation on each of the display modules by: outputting a second voltage to the corresponding first voltage terminal to change a potential difference between the corresponding driving node and the corresponding first voltage terminal, so that the corresponding driving sub-circuit outputs a current; and outputting the scanning signal to the corresponding scanning signal terminal, so that the current flows through the corresponding data writing sub-circuit to change a electromotive force of the corresponding driving node until the corresponding driving sub-circuit is turned off.

19. The driving method according to claim 18, wherein:
the driving circuit of the at least one of the display modules further comprises:
a first reset sub-circuit coupled to the control signal terminal, a reset control terminal, and the input terminal of the light-emitting element; and
a second reset sub-circuit coupled to the first reset sub-circuit, the reset control terminal, and the output terminal of the fingerprint detection element, and configured to output the signal of the control signal terminal transmitted through the first reset sub-circuit to the output terminal of the fingerprint detection element in response to a reset control signal of the reset control terminal; and
the driving method of the display device further comprises, during a reset period before the threshold compensation period, resetting each of the display modules by outputting a reset signal to the corresponding control signal terminal, and outputting the reset control signal to a corresponding reset control terminal, so that the reset signal is applied to the input terminal of the corresponding light-emitting element and the output terminal of the corresponding fingerprint detection element.

20. The driving method of the display device according to claim 19, wherein the driving method of the display device further comprises during the reset period, outputting the scanning signal to the scanning signal terminal of each of the display modules.

* * * * *